US010791684B2

(12) United States Patent
He et al.

(10) Patent No.: US 10,791,684 B2
(45) Date of Patent: Oct. 6, 2020

(54) INTELLIGENT GARDENING SYSTEM AND EXTERNAL DEVICE COMMUNICATING THEREWITH

(71) Applicant: POSITEC POWER TOOLS (SUZHOU) CO., LTD, Suzhou (CN)

(72) Inventors: Mingming He, Suzhou (CN); Gen Sun, Suzhou (CN); Yue Rao, Suzhou (CN); Yong Shao, Suzhou (CN); Fangshi Liu, Suzhou (CN); Jun Wu, Suzhou (CN); Chang Zhou, Suzhou (CN)

(73) Assignee: POSITEC POWER TOOLS (SUZHOU) CO., LTD, Suzhou (CN)

( * ) Notice: Subject to any disclaimer, the term of this patent is extended or adjusted under 35 U.S.C. 154(b) by 0 days.

(21) Appl. No.: 15/547,337

(22) PCT Filed: Jan. 29, 2016

(86) PCT No.: PCT/CN2016/072878
§ 371 (c)(1),
(2) Date: Jul. 28, 2017

(87) PCT Pub. No.: WO2016/119751
PCT Pub. Date: Aug. 4, 2016

(65) Prior Publication Data
US 2018/0000025 A1 Jan. 4, 2018

(30) Foreign Application Priority Data
Jan. 29, 2015 (CN) .......................... 2015 1 0047482
Mar. 24, 2015 (CN) .......................... 2015 1 0130184

(51) Int. Cl.
*A01G 25/16* (2006.01)
*B05B 12/04* (2006.01)
(Continued)

(52) U.S. Cl.
CPC ............ *A01G 25/167* (2013.01); *B05B 12/04* (2013.01); *G05B 15/02* (2013.01); *G05B 19/042* (2013.01);
(Continued)

(58) Field of Classification Search
CPC .... A01G 25/167; B05B 12/04; G05B 19/042; G05B 19/418; G05B 2219/2625;
(Continued)

(56) References Cited

U.S. PATENT DOCUMENTS 7,707,060 B2 * 4/2010 Chainer ............. G06Q 30/0201
360/31
8,027,761 B1 * 9/2011 Nelson ................ A01D 34/008
180/168
(Continued)

FOREIGN PATENT DOCUMENTS

CN 103701845 A 4/2014
CN 103728938 A 4/2014
(Continued)

OTHER PUBLICATIONS

International Search Report and Written Opinion dated Apr. 22, 2016 for PCT/CN2016/072878.
(Continued)

*Primary Examiner* — Kenneth M Lo
*Assistant Examiner* — Chad G Erdman
(74) *Attorney, Agent, or Firm* — Stoel Rives LLP

(57) ABSTRACT

The present invention relates to an intelligent gardening system, for monitoring and controlling gardening apparatuses in a gardening area, including: multiple sensors that collect environmental information of the gardening area; one or more gardening apparatuses that perform gardening work according to a control instruction; and a control center that generates the control instruction based on the environmental
(Continued)

information; wherein the sensors, the gardening apparatuses and the control center communicate with each other to form an Internet of Things.

34 Claims, 8 Drawing Sheets

(51) Int. Cl.
| | |
|---|---|
| *G05B 19/042* | (2006.01) |
| *H04L 29/08* | (2006.01) |
| *G05B 19/418* | (2006.01) |
| *H04W 4/00* | (2018.01) |
| *G05B 15/02* | (2006.01) |
| *H04W 4/70* | (2018.01) |

(52) U.S. Cl.
CPC ............ *G05B 19/418* (2013.01); *H04L 29/08* (2013.01); *H04L 67/10* (2013.01); *H04L 67/12* (2013.01); *H04L 67/18* (2013.01); *G05B 19/0426* (2013.01); *G05B 2219/2625* (2013.01); *H04W 4/70* (2018.02); *Y02P 60/214* (2015.11)

(58) Field of Classification Search
CPC ......... H04L 29/08; H04L 67/10; H04L 67/12; H04L 67/18; H04W 4/70; Y02P 60/214
See application file for complete search history.

(56) References Cited

U.S. PATENT DOCUMENTS

| | | | |
|---|---|---|---|
| 8,374,721 B2* | 2/2013 | Halloran | A47L 5/30 |
| | | | 700/245 |
| 8,649,907 B2 | 2/2014 | Ersavas | |
| 8,849,461 B2 | 9/2014 | Ersavas et al. | |
| 9,241,451 B2 | 1/2016 | Ersavas et al. | |
| 2008/0161968 A1* | 7/2008 | Adegbile | A01D 34/008 |
| | | | 700/245 |
| 2008/0167931 A1* | 7/2008 | Gerstemeier | G06Q 10/06 |
| | | | 705/7.22 |
| 2009/0216661 A1* | 8/2009 | Warner | G06Q 30/02 |
| | | | 705/26.1 |
| 2010/0038440 A1 | 2/2010 | Ersavas | |
| 2011/0035059 A1 | 2/2011 | Ersavas | |
| 2012/0011517 A1 | 1/2012 | Smith et al. | |
| 2012/0290165 A1* | 11/2012 | Ouyang | G05D 1/0255 |
| | | | 701/25 |
| 2013/0174040 A1 | 7/2013 | Johnson | |
| 2013/0226357 A1 | 8/2013 | Ersavas et al. | |
| 2013/0333342 A1* | 12/2013 | Keski-Luopa | A01D 43/14 |
| | | | 56/10.2 A |
| 2014/0107853 A1 | 4/2014 | Ashinghurst et al. | |
| 2014/0263822 A1 | 9/2014 | Malveux | |
| 2014/0303814 A1 | 10/2014 | Burema et al. | |
| 2014/0371928 A1 | 12/2014 | Ersavas et al. | |
| 2015/0106281 A1* | 4/2015 | Klavins | G06Q 10/063 |
| | | | 705/317 |
| 2016/0023357 A1* | 1/2016 | Dubrovsky | G05B 19/409 |
| | | | 700/257 |
| 2016/0026185 A1* | 1/2016 | Smith | G05D 1/0244 |
| | | | 356/614 |
| 2016/0082597 A1* | 3/2016 | Gorshechnikov | G06N 5/02 |
| | | | 700/253 |
| 2016/0135389 A1 | 5/2016 | Ersavas et al. | |
| 2016/0157275 A1* | 6/2016 | Matthews | H04W 76/10 |
| | | | 701/2 |
| 2016/0157422 A1* | 6/2016 | Kohler | A01D 34/008 |
| | | | 700/275 |

FOREIGN PATENT DOCUMENTS

| | | |
|---|---|---|
| CN | 104158250 A | 11/2014 |
| CN | 104181877 A | 12/2014 |
| TR | 200805998 A2 | 12/2009 |
| WO | 2010019109 A2 | 2/2010 |

OTHER PUBLICATIONS 16742813.5, European Examination Report, dated Sep. 6, 2019, 10 pages.

* cited by examiner

INTELLIGENT GARDENING SYSTEM AND EXTERNAL DEVICE COMMUNICATING THEREWITH

BACKGROUND

Technical Field

The present invention relates to an intelligent gardening system.

The present invention relates to an external device communicating with an intelligent gardening system.

Related Art

With development of technologies, electric tools are becoming more and more widely used, and working conditions are becoming more and more complex. To be able to design electric tools that meet requirements of different working conditions, electric tool makers need to do a lot of fieldwork. Research costs a lot of time and effort, but often cannot exhaust all use conditions, resulting in that designed electric tools cannot meet customers' demands well. In addition, when an electric tool fails and needs to be repaired, the maintenance personnel needs to rush to the scene to make analysis, and then gives diagnosis, which brings about inconvenience to the maintenance work.

Based on this, there is a strong demand that an electric tool can record its own use condition and transfer the recorded data to a terminal device or network. Any grantee may acquire desired data from the network, understand use conditions of the electric tool according to the data, and guide related work.

Likewise, a battery pack also has the above technical problem, and the above demand also exists in the design process of the battery pack.

With application of the Internet of Things technology in gardens, many companies develop Internet of Things-based sensors and central control systems. However, the intelligent level of the gardens are still insufficient at present, deep user involvement is required, deep understanding and exploration of user usage habits and personalization requirements are lacking, and targeted services are provided correspondingly.

SUMMARY

A technical problem to be solved in the present invention is to provide an intelligent gardening system.

An intelligent gardening system, for monitoring and controlling gardening apparatuses in a gardening area, including: multiple sensors that collect environmental information of the gardening area; one or more gardening apparatuses that perform gardening work according to a control instruction; and a control center that generates the control instruction based on the environmental information; wherein the sensors, the gardening apparatuses and the control center communicate with each other to form an Internet of Things.

Preferably, the intelligent gardening system further includes a self-moving device capable of autonomously moving in the gardening area.

Preferably, at least one of the gardening apparatuses is disposed on the self-moving device capable of autonomously moving in the gardening area.

Preferably, at least one of the sensors is located on the self-moving device capable of autonomously moving in the gardening area, and the sensor moves with the self-moving device to collect environmental information of multiple positions.

Preferably, the sensor includes a thermistor sensor located on a housing of the self-moving device, the thermistor sensor detecting an environment temperature value.

Preferably, the sensor includes an environment detection sensor that detects at least one of humidity, temperature, wind speed, illumination, PM2.5, PM10, pollen concentration, UV intensity, rain condition, snow condition and noise value in an environment of the gardening area.

Preferably, the sensor includes a soil detection sensor that detects at least one of humidity, temperature, nutrients and PH value of the soil.

Preferably, the sensor includes a vegetation detection sensor that detects at least one of moisture, nutrition, pests and heights of vegetation.

Preferably, the vegetation detection sensor includes a lawn detection sensor that detects at least one of density, distribution, bald grasses and weeds of a lawn.

Preferably, the sensor includes a foreign substance detection sensor that detects at least one of pets, excrement, metal, glass, dead leaves and ground collapse in the gardening area.

Preferably, the gardening apparatuses include at least one of a sprinkler, a fertilizer apparatus, a plant pruning apparatus and a soil treatment apparatus.

Preferably, the intelligent gardening system further includes a locating apparatus located on the self-moving device, to acquire position information of a particular position while acquiring environmental information of the particular position, and the control module generates, according to the environmental information and the position information of the particular position, a control instruction of controlling an operating module at the particular position.

Preferably, the control center is located on the self-moving device.

Preferably, the control center includes a memory that stores data monitored by the sensor and/or analytical/statistical data of the intelligent gardening system.

Preferably, the control center includes a depth learning module that learns, according to input signals of at least one sensor, users' usage habits and optimizes operating parameters of the intelligent gardening system.

Preferably, the Internet of Things transmits data between at least part of nodes in the form of encryption.

Preferably, the control center includes a data sharing module that can send data of the intelligent gardening system to a particular target under the control of a user.

Preferably, the particular target is a social network platform, and the data includes at least one of gardening images, gardening achievement and summarized gardening data.

Preferably, the particular target is a commercial data platform, and the data includes at least one of user gardening condition information, user habit information and gardening material requirement information.

Preferably, the intelligent gardening system is connected to an external Internet of Things, and optimizes an operating procedure of the intelligent gardening system based on data of the external Internet of Things.

Preferably, the external Internet of Things is an Internet of Things of user home.

Preferably, the intelligent gardening system has a distributed computing network that includes multiple sensors and/or computing units of the gardening apparatuses.

Preferably, the distributed computing network is connected to external computing resources, and receives computing results from the external computing resources.

Preferably, the intelligent gardening system includes a D-GPS base station, and the intelligent gardening system is connected to an external Internet of Things system and shares signals of the D-GPS base station therewith.

Preferably, the self-moving device is an unmanned aerial vehicle that is provided with a camera.

Preferably, the unmanned aerial vehicle monitors a clean status of a user's roof and sweeps the roof accordingly.

Preferably, the unmanned aerial vehicle includes an air-blowing structure that blows air towards the roof to sweep the roof.

Preferably, the control center generates, according to gardening data produced in the work of the intelligent gardening system, a garden design report that includes at least one of a garden vegetation distribution proposal, a gardening apparatus arrangement proposal, a garden vegetation varieties proposal and a garden modification and construction scheme.

Preferably, the gardening apparatuses include an animal herding apparatus that herds animals using at least one of ultrasound, sound and water column.

Preferably, the control center communicates with a user equipment.

Preferably, the control center sends at least one of prompt information, statistic information, gardening proposal information, service information and order information.

Preferably, the control center receives a control instruction from the user equipment to perform a user-desired operation.

Preferably, the intelligent gardening system includes multiple operating modes that include at least one of a party mode, a security mode, a vacation mode and a home mode, the control center configures operating statuses of the sensors and the gardening apparatuses according to the modes, wherein in the party mode, the intelligent gardening system configures operating parameters suitable for holding a party in the gardening area; in the security mode, the intelligent gardening system configures operating parameters suitable for users' leaving home; in the vacation mode, the intelligent gardening system configures operating parameters suitable for users' leaving home for several days; and in the home mode, the intelligent gardening system configures operating parameters suitable for users' being at home.

Preferably, in the party mode, multiple gardening apparatuses leave personnel activity areas in the gardening area or stop operating; in the security mode, the gardening apparatuses perform security work; in the vacation mode, some facilities in the gardening area are turned off; and in the home mode, the intelligent gardening system adjusts operating parameters of the gardening apparatuses to reduce operating noise.

Preferably, the intelligent gardening system communicates with an external device, and sends data generated in the operation to the external device, and the external device includes at least one of a manufacturer device, a distributor device, a designer device and a service provider device.

An external device communicating with at least one intelligent gardening system, wherein the external device acquires data generated by the intelligent gardening system in the operation, and generates a data application policy based on the data, and the external device is a manufacturer device.

Preferably, the data includes at least one of data detected by the sensors, operation or fault data of the gardening apparatuses and analytical data of the intelligent gardening system.

Preferably, the data application policy includes at least one of a production plan improvement policy, a manufacturing process and/or production process improvement policy, an intelligent gardening system configuration adjustment policy, a product orientation sales and/or recommendation policy and a security policy.

An external device communicating with at least one intelligent gardening system, wherein the external device acquires data generated by the intelligent gardening system in the operation, and generates a data application policy based on the data, and the external device is a distributor device.

Preferably, the data application policy includes at least one of a stocking policy, a logistics policy, a product recommendation policy, a maintenance reminder policy and a directed marketing policy.

An external device communicating with at least one intelligent gardening system, wherein the external device acquires data generated by the intelligent gardening system in the operation, and generates a data application policy based on the data, and the external device is a service provider device.

Preferably, the data application policy includes at least one of a service scheduling policy, a directed service policy and a neighbor resource invocation policy.

An external device communicating with at least one intelligent gardening system, wherein the external device acquires data generated by the intelligent gardening system in the operation, and generates a data application policy based on the data, and the external device is a designer device.

Preferably, the data application policy includes at least one of a product definition policy and a product design policy.

A data transmission system of an electric tool is provided.

Based on this, it is necessary to provide a system capable of transmitting data of an electric tool to a movable terminal or network terminal.

A data transmission system of an electric tool, including: an electric tool; a terminal device that has a network transmission function, for sending and receiving data; and a cloud that has a network transmission function and has data processing and analysis functions; wherein the electric tool, the terminal device and the cloud are all provided with a communication apparatus; and the electric tool, the terminal device and the cloud can transmit data therebetween.

The data transmission system of an electric tool can transmit data of the electric tool such as running parameters and use conditions to the terminal device or the cloud. Any grantee may acquire desired data from the cloud, understand use conditions of the electric tool according to the data, and analyze desired information according to the use conditions, to guide related work, which does not require the staff to go to the scene to do research and analysis, thereby facilitating work and reducing the cost.

In an embodiment, the communication apparatuses transmit data therebetween through wired communication, radio frequency identification, Zigbee, Bluetooth, near-field wireless communication, WiFi, Bluetooth low energy or Z-Wave.

In an embodiment, the electric tool includes an electric tool storage module that stores data, and the data stored by the electric tool storage module is transmitted to the cloud through the terminal device. The electric tool includes an electric tool storage module, so that when data transmission is impossible, data of the electric tool is stored and then is transmitted to the cloud when data transmission is possible.

In an embodiment, the data transmission system of an electric tool further includes a battery pack that supplies power for the electric tool, the battery pack is provided with a communication apparatus, and the battery pack and the terminal device can mutually transmit data therebetween.

In an embodiment, the battery pack includes a battery pack storage module that stores usage information of the battery pack, and the information stored by the battery pack storage module is transmitted to the cloud through the terminal device.

In an embodiment, the battery pack and the electric tool can mutually transmit data therebetween. The electric tool includes an electric tool storage module that stores data, and the data stored by the electric tool storage module is transmitted to the battery pack storage module via the data between the battery pack and the electric tool.

In an embodiment, the electric tool includes at least one sensor. Data of the electric tool or an external environment acquired by the sensor is transmitted through a communication apparatus, and the cloud analyzes the data and generates corresponding information.

In an embodiment, the electric current includes a current sensor for detecting an operating current of the electric tool. The current sensor real-time transmits a detected signal to the cloud, and the cloud generates corresponding information according to the signal.

In an embodiment, the battery pack includes at least one sensor. Data of the electric tool or an external environment acquired by the sensor is transmitted through a communication apparatus, and the cloud analyzes the data and generates corresponding information.

In an embodiment, the electric tool includes a GPS module that real-time transmits acquired coordinate information to the cloud. The cloud compares the acquired coordinate information with a preset coordinate range. If the acquired coordinate information is beyond the preset coordinate range, the cloud generates pre-warning information. The cloud real-time acquires coordinate information generated by the GPS module, and compares the coordinate information with a preset coordinate range, thus playing a role of prevention of burglary.

In an embodiment, the electric tool includes a fault detection module. When a fault occurs in the electric tool, the fault detection module sends fault information of the electric tool to the cloud, and the cloud analyzes the fault information, generates maintenance information, and sends the maintenance information to the terminal device.

In an embodiment, the terminal device includes a display module for displaying the maintenance information.

In an embodiment, the terminal device includes a video call module that makes a video call with the cloud.

In an embodiment, the data transmission system of an electric tool further includes a software updating module. The software updating module is disposed on the electric tool and/or the terminal device, and the software updating module is connected to the corresponding communication apparatus. The cloud transmits software-upgraded data to the software updating module, and the software updating module upgrades corresponding software of the electric tool and/or the terminal device.

In an embodiment, the data transmission system of an electric tool further includes a charger that supplies power for the electric tool. The charger is provided with a communication apparatus, and the charger and the terminal device can mutually transmit data therebetween.

The present invention has the following beneficial effects: the data transmission system of the electric tool and the battery pack may record data during use of the electric tool and the battery pack, and transmit the data to the network, so that any grantee can obtain data in a use process thereof through the network, to understand the use process, and analyze desired information according to the user process.

BRIEF DESCRIPTION OF THE DRAWINGS

The technical problem solved, the technical solutions and the beneficial effects of the present invention can be clearly obtained through the following detailed descriptions about preferred specific embodiments capable of implementing the present invention and in combination with the descriptions about the drawings.

Like signs and symbols in the drawings and the specification are used to represent like or equivalent elements.

| | |
|---|---|
| 1 | electric tool |
| 3 | battery pack |
| 5 | charger |
| 6 | terminal device |
| 8 | cloud |
| 10 | battery pack storage module |
| 12 | electric tool storage module |
| 13 | terminal device storage module |
| 14 | battery pack transmission module |
| 16 | electric tool transmission module |
| 18 | terminal device transmission module |
| 20 | battery pack receiving module |
| 22 | electric tool receiving module |
| 24 | terminal device receiving module |
| 26 | charger transmission module |
| 30 | garden |
| 31 | sensor |
| 32 | mower |
| 33 | control center |
| 34 | house |
| 35 | intelligent gardening system |
| 36 | user |
| 37 | user equipment |
| 38 | neighbor |
| 39 | service provider |
| 40 | manufacturer |
| 41 | distributor |
| 42 | room Internet of Things system |
| 43 | irrigation apparatus |

DETAILED DESCRIPTION

Detailed descriptions and technical contents of the present invention are provided as follows with reference to the drawings. However, the drawings merely provide reference and description, but are not used to limit the present invention.

First Embodiment

Figure 1:
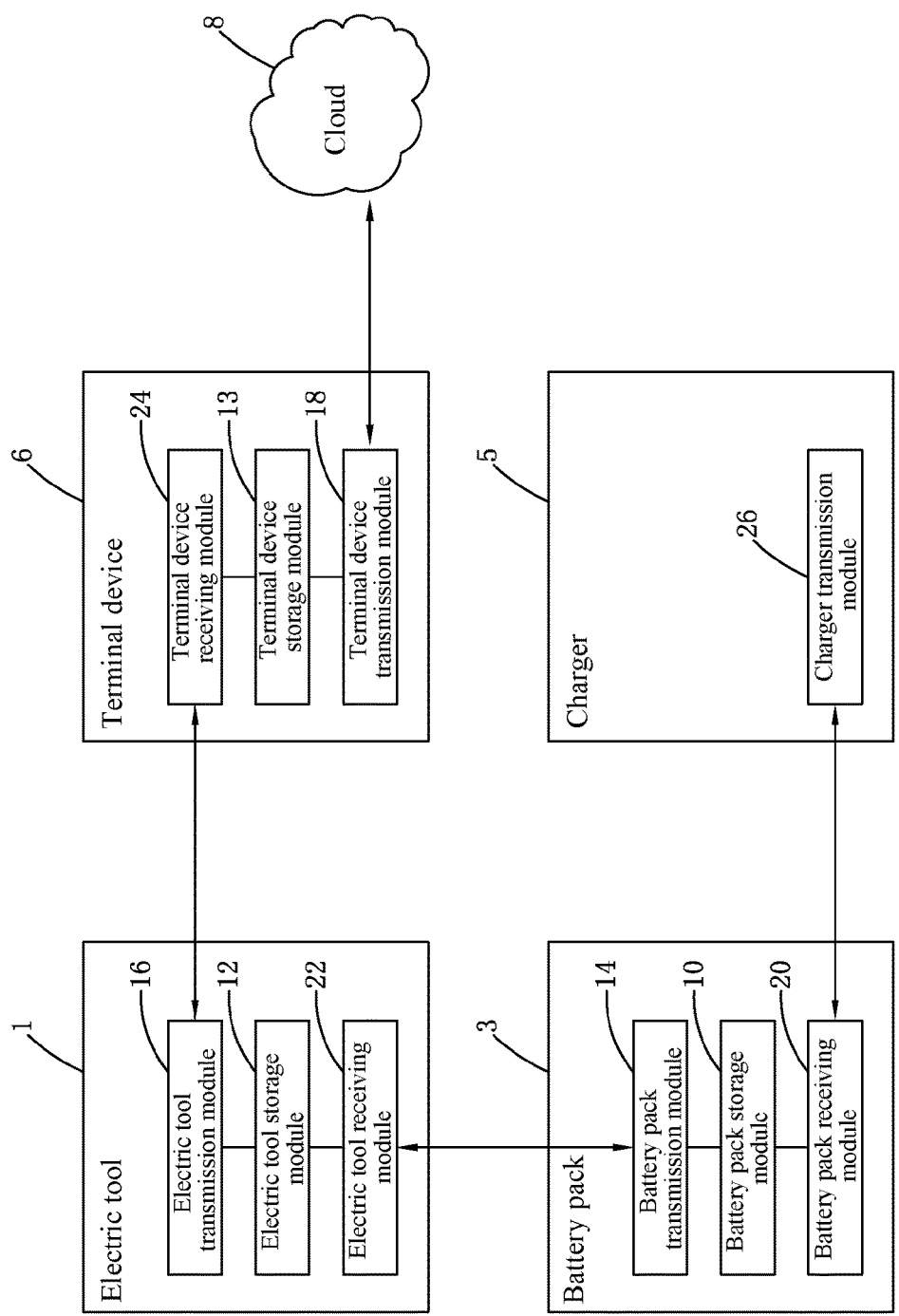
FIG. 1 is a structural block diagram of a first embodiment of the present invention.

As shown in FIG. 1, a data transmission system of an electric tool 1 includes an electric tool 1, a terminal device 6 and a cloud 8. The electric tool 1 may be a handheld electric tool, a garden electric tool or the like. The electric tool includes, but is not limited to, an electric drill, an electric wrench, an electric screwdriver, an electric hammer, a shock drill, an electric plane, a lawn mower, a grass trimmer and the like. The terminal device 6 may be an electronic device such as a mobile phone, a special handheld device, and a tablet computer.

The electric tool 1, the terminal device 6 and the cloud 8 are all provided with a communication apparatus. These communication apparatuses are used to send and/or receive data. In this implementation, data transmission among them is implemented through the communication apparatuses. The electric tool 1 may transmit data with the terminal device 6. The terminal device 6 and the cloud 8 may transmit data, such that the terminal device 6 can further transmit data received from the electric tool 1 to the cloud 8, and the data of the cloud 8 can also be transmitted to the electric tool 1 via the terminal device 6. The data transmission between the electric tool 1 and the terminal device 6 and the data transmission between the terminal device 6 and the cloud 8 may be conducted in a wired or wireless manner. The wired manner is direct transmission through a data interface or a data line. The wireless manner includes conducting data transmission through radio frequency identification, Zigbee, Bluetooth, near-field wireless communication, WiFi, Bluetooth low energy or Z-Wave. Those skilled in the art may select a corresponding type of communication apparatus through a different data transmission manner.

Continuously referring to FIG. 1, the electric tool 1 may further include an electric tool storage module 12. The communication apparatus of the electric tool 1 includes an electric tool transmission module 16 that sends data to the terminal device 6 and/or receives data sent by the terminal device 6. The electric tool storage module 12 is used for storing data during use of the electric tool 1. The data includes at least one of the following: a user, an operating environment, an operating frequency, a place of use, a running parameter during use and so on. The running parameter of the electric tool 1 includes at least one of voltage, current, temperature, speed and torque.

Continuously referring to FIG. 1, the electric tool transmission module 16 is electrically connected to the electric tool storage module 12, acquires information stored by the electric tool storage module 12, and transmits the stored information to the terminal device 6.

Continuously referring to FIG. 1, the terminal device 6 includes a terminal device storage module 13, a terminal device transmission module 18, and a terminal device receiving module 24. The communication apparatus of the terminal device 6 includes the terminal device transmission module 18 and the terminal device receiving module 24. The terminal device receiving module 24 receives data transmitted from the electric tool transmission module 16, and transmits the received data to the terminal device storage module 13. The terminal device storage module 13 stores data transmitted from the terminal device receiving module 24, and further transmits the stored data to the terminal device transmission module 18. The terminal device transmission module 18 transmits information transmitted from the terminal device storage module 13 to the cloud 8.

In the foregoing description, the data of the electric tool 1 is finally transmitted to the cloud 8 via the terminal device 6. Any grantee may acquire the data of the electric tool 1 from the cloud 8 and extract desired information therefrom.

In this implementation, the electric tool 1 may not include the electric tool storage module 12, and the terminal device 6 may not include the terminal device storage module 13. In this case, the electric tool 1 real-time transmits data to the terminal device 6, and the terminal device 6 real-time transmits data to the cloud 8.

Those skilled in the art may understand that any grantee may also publish operational information at the cloud 8. The operational information includes an operation instruction for the electric tool 1. The operational information of the cloud 8 is sent to the terminal device transmission module 18, and is transmitted to the electric tool 1 by the terminal device receiving module 24.

Those skilled in the art may dispose a corresponding module or apparatus on the electric tool to obtain the data described above. A specific example is given below for description.

The electric tool 1 may include at least one sensor for acquiring data of the electric tool or an external environment. The sensor includes, but is not limited to, a temperature sensor, a humidity sensor, a photoelectric sensor, a speed sensor, a hall sensor and so on. The temperature and humidity of the external environment or a running parameter during use of the electric tool may be acquired through the corresponding sensor. The running parameter during use of the electric tool may be data such as voltage, current, temperature, speed and torque. Those skilled in the art may understand that different sensors and corresponding positions of the sensors are set so as to obtain different data. The electric tool 1 transmits acquired data to the cloud 8, the cloud 8 analyzes and processes the data, and then the cloud 8 sends action information of related work. The action information may be displayed on the terminal device 6, and then an operator manually operates the electric tool 1, or the action information is transmitted to the electric tool 1 directly or through the terminal device 6, and the electric tool 1 automatically regulates related operations.

The electric tool 1 may be provided with a current sensor for detecting an operating current of the electric tool. The current sensor may be a shunt, an electromagnetic current transformer, an electronic current transformer or the like. When the operating current detected by the current sensor exceeds a threshold, it indicates that the electric tool 1 is in an operating status. The current sensor then sends a signal indicating that the electric tool 1 is operating, and the signal is transmitted to the cloud 8 through the communication apparatus of the electric tool 1. The cloud 8 may preset an operating time limit, an operating time period, an operating frequency and the like of the electric tool 1. When the electric tool 1 exceeds the operating time limit or is not in the operating time period or has a high operating frequency, it indicates that the electric tool 1 is in a non-rational operating status. The cloud 8 sends pre-warning information, and the pre-warning information may be transmitted to the terminal device 6, to prompt the operator that the electric tool 1 is in a corresponding non-rational operating status; or the pre-warning signal is transmitted to the electric tool 1, and the electric tool 1 sends a corresponding signal which may be a buzzing or light flashing signal, to prompt the user that the electric tool 1 is in a non-rational operating status.

The electric tool 1 may further include a GPS module that acquires coordinate information of the electric tool 1 to confirm the position of the electric tool 1. The cloud 8 stores a preset coordinate range. If the acquired coordinate information exceeds the preset coordinate range, the cloud 8 sends pre-warning information that may be transmitted to the terminal device 6 to prompt the operator that the electric tool 1 may be stolen; or the pre-warning information is transmitted to the electric tool 1, and the electric tool 1 sends a corresponding signal which may be a buzzing or light flashing signal, to achieve a function of prevention of burglary.

The electric tool 1 may further include a fault detection module. When a fault occurs in the electric tool, the fault detection module sends fault information of the electric tool 1 to the cloud 8, and the cloud 8 analyzes the fault information, generates maintenance information, and sends the maintenance information to the terminal device 6. The terminal device 6 is provided with a display module, and the maintenance information may be displayed in the display module in the form of text or video or an image, such that a maintainer can easily obtain the maintenance information. Certainly, the maintenance information may also be obtained by the maintainer in the form of sound. Those skilled in the art may understand that the display module may also be replaced with a corresponding module.

The terminal device 6 may further include a video call module that makes a video call with the cloud 8 through the communication apparatus disposed on the terminal device 6.

When the maintainer cannot maintain the electric tool 1 through the maintenance information sent by the cloud, a technician may make a video call with the maintainer holding the terminal device 6 at the cloud 8, to remotely guide the maintainer to maintain the electric tool.

The data transmission system of the electric tool may further include a software updating module that may be disposed on the electric tool 1 and/or the terminal device 6. When the electric tool 1 is provided with a software updating module, the software updating module is connected to the electric tool transmission module 16, the cloud 8 transmits software-upgraded data to the software updating module, and the software updating module upgrades a program of a control mainboard on the electric tool 1 or a program of another device such as a sensor, such that the program may be adjusted according to different requirements. When the terminal device 6 is provided with a software updating module, the software updating module is connected to the terminal device transmission module 18, the cloud 8 transmits software-upgraded data to the software updating module, and the software updating module upgrades an application on the terminal device 6, such that the application may be adjusted according to different requirements, such as fixing a bug and adding a new function. Certainly, the electric tool 1 and the terminal device 6 may be both provided with a software updating module, which are used to update corresponding programs on the electric tool 1 and the terminal device 6 respectively, to obtain good user experience.

When the data transmission system of the electric tool may acquire use condition information of the user through a combination of various sensors or modules or apparatuses disposed on different electric tools described above, and send the information to the cloud 8. The cloud 8 analyzes the information, to then obtain garden areas, proportions of various types of garden areas and so on. An electric tool provider, as a grantee, may acquire corresponding information from the cloud 8, to recommend the corresponding electric tool to the user, and the information may be displayed in the display module of the terminal device 6.

Continuously referring to FIG. 1, the data transmission system of the electric tool further includes a battery pack 3 capable of transmitting data with the electric tool 1, and a charger 5 capable of transmitting data with the battery pack 3. Those skilled in the art may understand that the data transmission system of the electric tool may not include at least one of the battery pack 3 and the charger 5.

The battery pack 3 includes a battery pack storage module 10, a battery pack transmission module 14 and a battery pack receiving module 20. The communication apparatus of the battery pack 3 includes the battery pack transmission module 14 and the battery pack receiving module 20. The charger 5 includes a charger transmission module 26. The charger transmission module 26 transmits usage information during use of the charger 5 to the battery pack receiving module 20 of the battery pack 3.

According to the usage information, power, the number of times of charging, temperature, and full power of the battery pack may be acquired by disposing corresponding sensors on the battery pack 3. The battery pack receiving module 20 transmits the received information to the battery pack storage module 10. The battery pack storage module 10 stores usage information during use of the battery pack 3, and further stores usage information of the charger 5 received by the battery pack receiving module 20. The battery pack storage module 10 further transmits the stored information to the battery pack transmission module 14. The battery pack transmission module 14 transmits the received information to the electric tool receiving module 22. The electric tool receiving module 22 transmits the received information to the electric tool storage module 12 and stores the information. All the information stored by the electric tool storage module 12 may be further transmitted to the electric tool transmission module 16, then further transmitted outwards, and finally transmitted to the cloud 8. The cloud 8 analyzes the data, and when the cloud 8 judges that the battery pack 3 ages, the cloud 8 prompts the user on the terminal device 6 to replace the battery pack 3.

When the cloud 8 publishes operational information, upon an inverse process of the above, the operational information may be transmitted to the terminal device 6, the electric tool 1, the battery pack 3, and the charger 5 one by one. Repetition is not provided herein.

Second Embodiment

Figure 2:
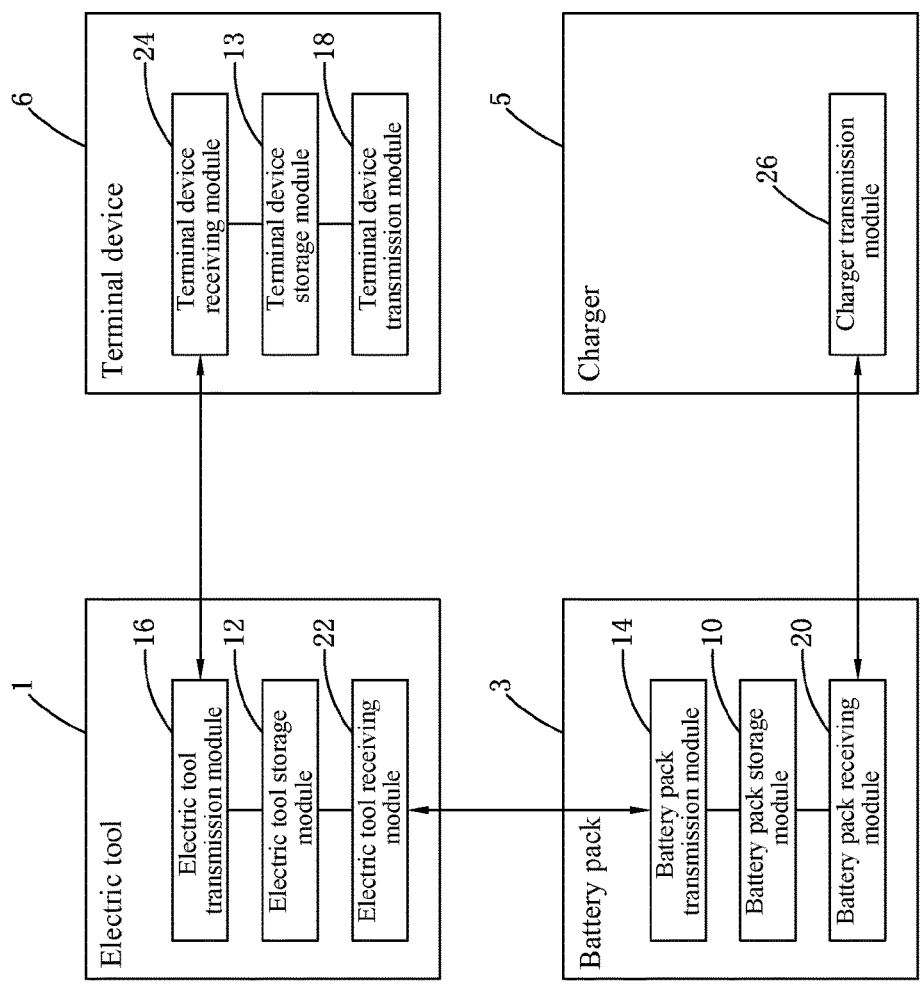
FIG. 2 is a structural block diagram of a second embodiment of the present invention.

Referring to FIG. 2, a data transmission system of an electric tool 1 includes the electric tool 1 and a terminal device 6. The structure of the electric tool 1 and the data transmission manner between it and the terminal device 6 are the same as those in the first embodiment. Different from the first embodiment, in this embodiment, data of the terminal device 6 does not need to be further transmitted to the cloud 8.

Third Embodiment

Figure 3:
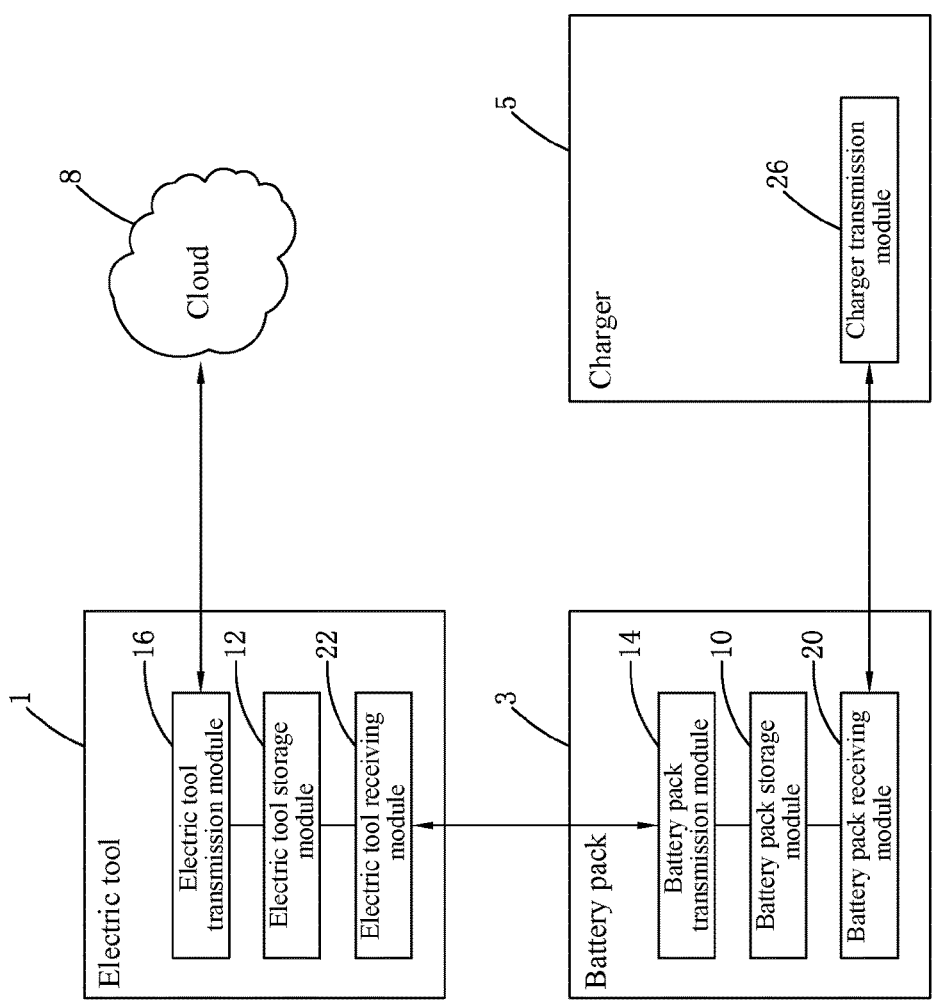
FIG. 3 is a structural block diagram of a third embodiment of the present invention.

Referring to FIG. 3, a data transmission system of an electric tool 1 includes the electric tool 1 and a cloud 8. The structure of the electric tool 1 is the same as that in the implementation shown in FIG. 1. Different from the implementation shown in FIG. 1, in this implementation, the data transmission system of the electric tool 1 transmits data to the cloud 8 directly. Data transmission between the electric tool 1 and the cloud 8 is conducted in a wireless manner. The wireless manner includes radio frequency identification, Zigbee, Bluetooth, near-field wireless communication, WiFi, Bluetooth low energy or Z-Wave.

Fourth Embodiment

Figure 4:
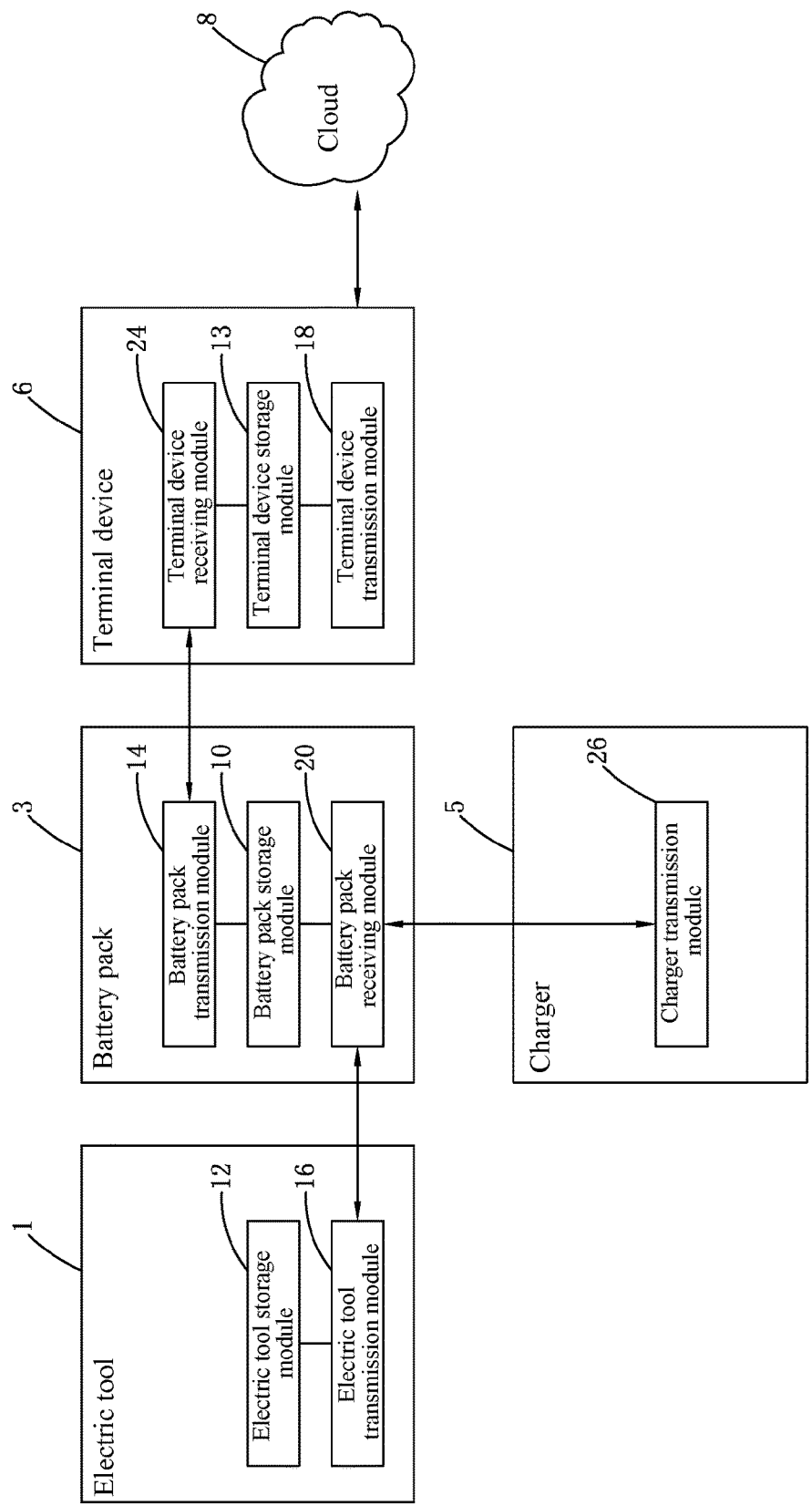
FIG. 4 is a structural block diagram of a fourth embodiment of the present invention.

Referring to FIG. 4, data of an electric tool 1 of a data transmission system of the electric tool 1 is transmitted with the terminal 6 through a battery pack 3, and the terminal device 6 transmits data with a cloud 8. The battery pack 3 may transmit data with the terminal device 6. The terminal device 6 and the cloud 8 may transmit data, such that the terminal device 6 can further transmit data received from the battery pack 3 to the cloud 8, and data of the cloud 8 can also be transmitted to the battery pack 3 via the terminal device 6. The data transmission between the battery pack 3 and the terminal device 6 and the data transmission between the terminal device 6 and the cloud 8 may be conducted in a wired or wireless manner. The wired manner is direct transmission through a data interface or a data line. The wireless manner includes radio frequency identification, Zigbee, Bluetooth, near-field wireless communication, WiFi, Bluetooth low energy or Z-Wave.

Continuously referring to FIG. 4, the battery pack 3 includes a battery pack storage module 10 and a battery pack transmission module 14. The battery pack storage module 10 is used for storing usage information during use of the battery pack 3. The usage information includes a user, an operating environment, an operating frequency, a place of use, a running parameter during use and so on. The running parameter of the battery pack 3 includes voltage, current, temperature and so on. The battery pack transmission module 14 is electrically connected to the battery pack storage module 10, acquires the information stored by the battery pack storage module 10, and transmits the stored information to the terminal device 6.

Continuously referring to FIG. 4, the terminal device 6 includes a terminal device storage module 13, a terminal device transmission module 18 and a terminal device receiving module 24. The terminal device receiving module 24 receives information transmitted from the battery pack transmission module 14, and transmits the received information to the terminal device storage module 13. The terminal device storage module 13 stores the information transmitted from the terminal device receiving module 24, and further transmits the stored information to the terminal device transmission module 18. The terminal device transmission module 18 transmits the information transmitted from the terminal device storage module 13 to the cloud 8.

In the above description, the usage information of the battery pack 3 is finally transmitted to the cloud 8 via the terminal device 6. Any grantee can acquire usage information of the electric tool 1 from the cloud 8, and extract desired information therefrom.

In this implementation, the battery pack 3 may not include the battery pack storage module 10, and the terminal device 6 may not include the terminal device storage module 13. In this case, the battery pack 3 real-time transmits data to the terminal device 6, and the terminal device 6 real-time transmits data to the cloud 8.

Those skilled in the art may understand that any grantee can also publish operational information at the cloud 8. The operational information includes an operation instruction for the battery pack 3. The operational information of the cloud 8 is transmitted to the battery pack 3 via the terminal device 6.

Referring to FIG. 4, the data transmission system of the electric tool 1 may further include a charger 5 transmitting data with the battery pack 3.

The charger 5 includes a charger transmission module 26. The charger transmission module 26 transmits usage information during use of the charger 5 to the battery pack receiving module 20 of the battery pack 3. The battery pack receiving module 20 transmits the received information to the battery pack storage module 10. The battery pack storage module 10 stores usage information during use of the battery pack 3, and also stores the usage information of the charger 5 received by the battery pack receiving module 20. The battery pack storage module 10 further transmits the stored information to the battery pack transmission module 14. The battery pack transmission module 14 transmits the received information to the terminal device receiving module 24, and the information is finally transmitted to the cloud 8. When the cloud 8 publishes operational information, via an inverse process of the above, the operational information can be transmitted to the terminal device 6, the battery pack 3 and the charger 5 one by one. Repetition is not provided herein.

The electric tool 1 includes an electric tool storage module 12 and an electric tool transmission module 16. The electric tool 1 only includes a transmitter of a communication apparatus for transmitting data. The electric tool storage module 12 stores usage information during use of the electric tool 1, and transmits the usage information to the electric tool transmission module 16. The electric tool transmission module 16 transmits the received information to the battery pack receiving module 20 of the battery pack 3. The battery pack receiving module 20 transmits the received information to the battery pack storage module 10. The battery pack storage module 10 stores usage information during use of the battery pack 3, and also stores the usage information of the electric tool 1 received by the battery pack receiving module 20. The battery pack storage module 10 further transmits the stored information to the battery pack transmission module 14. The battery pack transmission module 14 transmits the received information to the terminal device receiving module 24, and the information is finally transmitted to the cloud 8. When the cloud 8 publishes operational information, via an inverse process of the above, the operational information can be transmitted to the terminal device 6, the battery pack 3 and the charger 5 one by one. Repetition is not provided herein.

Fifth Embodiment

Figure 5:
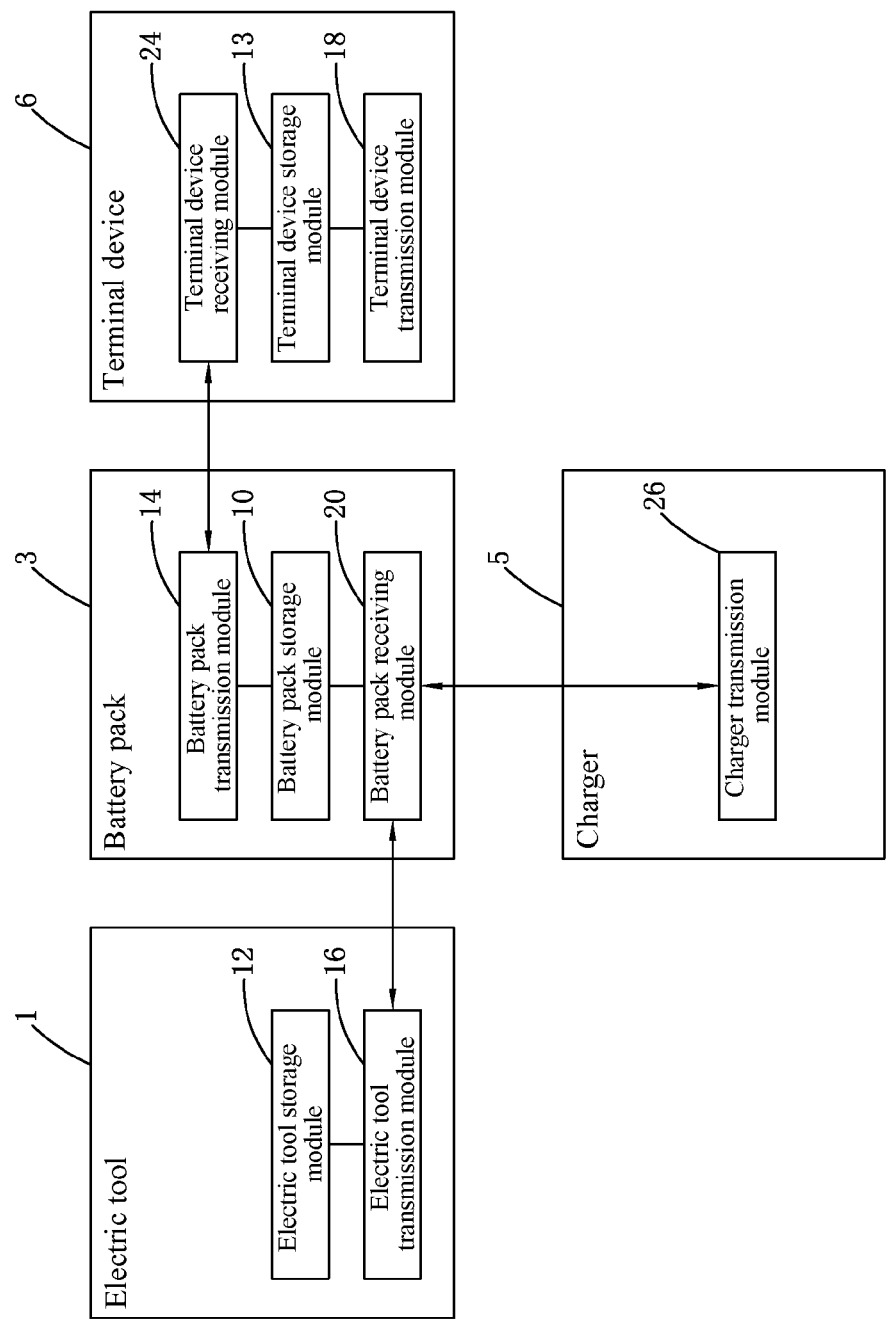
FIG. 5 is a structural block diagram of a fifth embodiment of the present invention.

As shown in FIG. 5, compared with the fourth embodiment, the data transmission system of the electric tool 1 includes the electric tool 1, a battery pack 3, a charger 5 and a terminal device 6. The structure of the battery pack 3 and the data transmission manner between it and the terminal device 6 are the same as those in the implementation shown in FIG. 4. Different from the implementation shown in FIG. 4, in this implementation, data of the terminal device 6 does not need to be further transmitted to the cloud 8.

Sixth Embodiment

Figure 6:
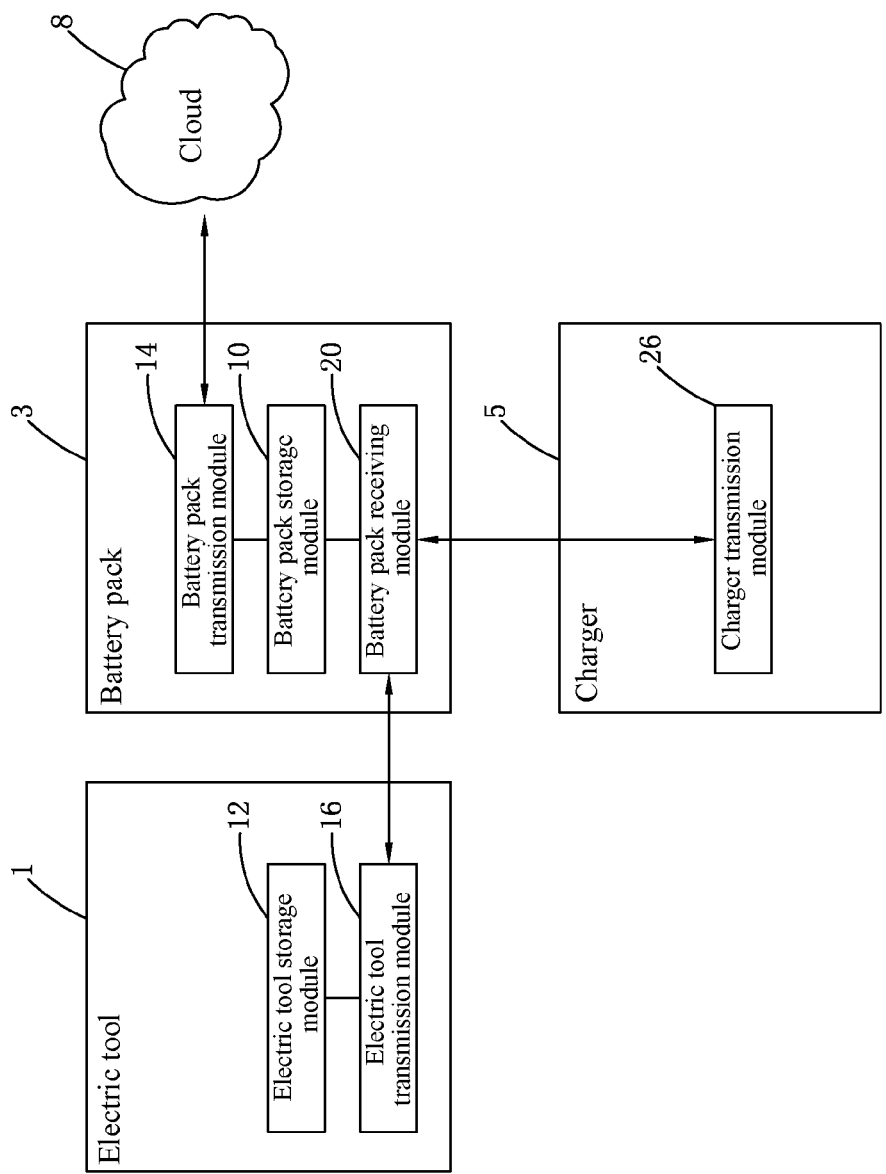
FIG. 6 is a structural block diagram of a sixth embodiment of the present invention.

As shown in FIG. 6, compared with the fourth embodiment, the data transmission system of the electric tool 1 includes the electric tool 1, a battery pack 3, a charger 5 and a cloud 8. The structure of the battery pack 3 is the same as the structure of the battery pack 3 in the fourth embodiment. Different from the fourth embodiment, in this implementation, the data transmission module of the battery pack 3 transmits data to the cloud 8 directly.

Data transmission between the battery pack 3 and the cloud 8 is conducted in a wireless manner.

The above implementation is also applicable to direct data transmission between the charger 5 and the terminal device 6, and direct data transmission between the charger 5 and the cloud 8, which are not repeated herein one by one.

Seventh Embodiment

Figure 7:
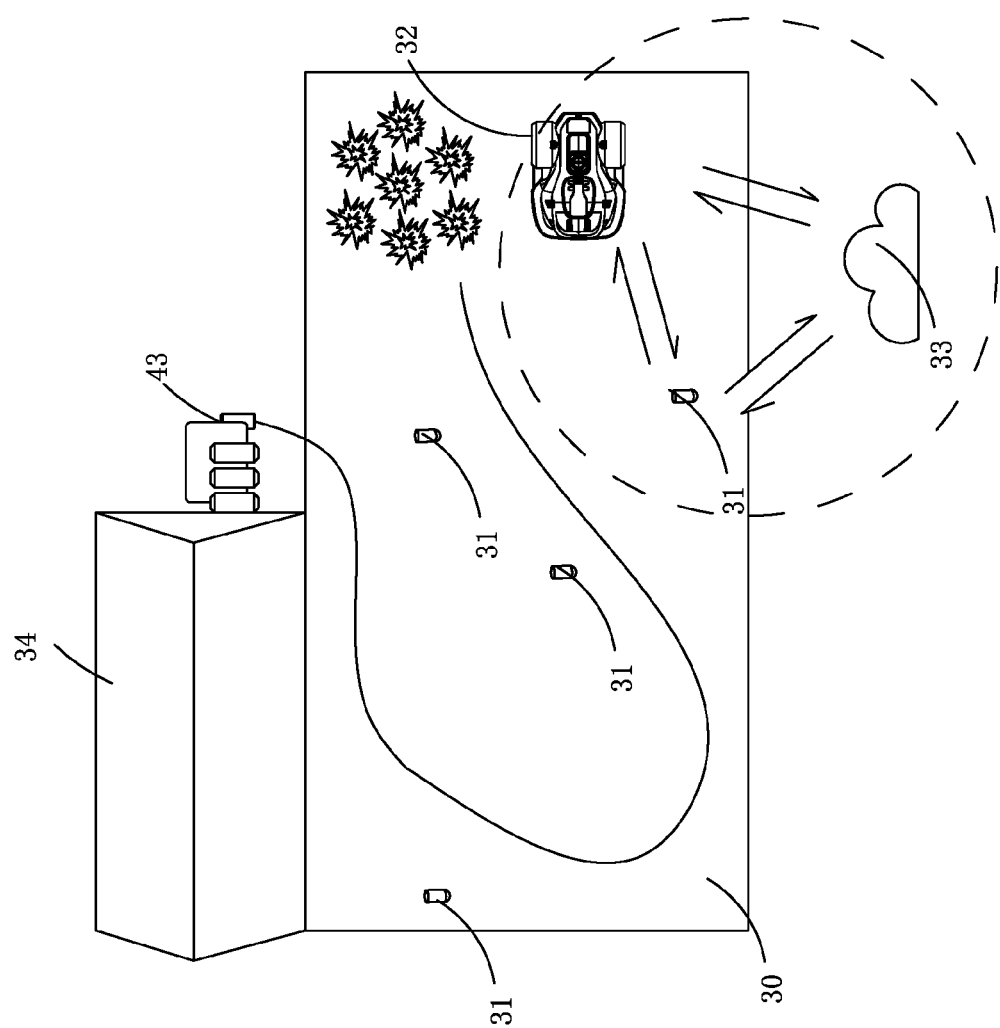
FIG. 7 is a schematic structural diagram of a seventh embodiment of the present invention.

As shown in FIG. 7, this embodiment discloses an Internet of Things-based intelligent gardening system.

The intelligent gardening system is arranged in a garden 30, including a sensor 31 detecting various kinds of data in the garden 30; gardening apparatuses that perform gardening work, such as a lawn mower 32 and an irrigation apparatus 43; and a control center 33 that receives information of the sensor 31 and the gardening apparatuses. The intelligent gardening system may further include a self-moving device on which the sensor 31 is mounted. The self-moving device may also be mounted with various kinds of gardening apparatuses, to form an intelligent lawn mower, an intelligent sprinkler, an intelligent scarifier and so on. The intelligent gardening system may communicate with a room Internet of Things in the user's house 34, to cooperate and exchange information therewith, thereby further optimizing user experience.

The control center 33 may be arranged on the self-moving device, or in a stop of the self-moving device, may also be arranged in the user's home or at a fixed position in the garden, and may further be arranged on a remote server at a cloud. In an implementation, the sensor and the gardening apparatuses are connected to the self-moving device or the stop and transmit data detected by the sensor and usage data of the gardening apparatuses, and the self-moving device or the stop collects and summarizes the received data, preliminarily analyzes the data and then transmits the data to the control center. In this way, network resources can be saved, and the load of the cloud server is reduced. The Internet of Things transmits data between at least part of nodes in the form of encryption.

The foregoing sensors, gardening apparatuses, control center and the like make up an Internet of Things, the Internet of Things conducts communication in various manners, for example, zigbee, wife, a cellular mobile network such as a 4G network, and so on, and transmission manners of different node paths may be the same or different.

The intelligent gardening system further includes a locating apparatus located on the self-moving device, to acquire position information of a particular position while acquiring environmental information of the particular position, and the control module generates, according to the environmental information and the position information of the particular position, a control instruction of controlling an operating module at the particular position.

The control center includes a memory that stores data monitored by the sensor and/or analytical/statistical data of the intelligent gardening system.

The sensor in the system is introduced below.

As stated previously, the sensor may be fixedly arranged in the garden, and may also be carried by the self-moving device to move in the garden, to collect data of various positions. For example, a temperature sensor, a humidity sensor, a photoelectric sensor and so on may be disposed on an intelligent lawn mower. The temperature sensor may be used for detecting the temperature of a lawn or the air. The humidity sensor may be used for detecting humidity of the lawn or the air. The photoelectric sensor may be used for detecting the height of the lawn. The temperature sensor may be a thermistor arranged on a housing of the lawn mower, to detect an environmental temperature in real time and accurately. The above sensors transmit acquired data to the cloud 8 or the control center. The cloud 8 or the control center processes and analyzes the data through internal software, sends action information of related work to the terminal device 6 or the intelligent lawn mower and other gardening apparatuses, and prompts the operator to apply fertilizer, water or adjust the cutting height of the intelligent lawn mower.

More specifically, the sensor may include an environment detection sensor that detects at least one of humidity, temperature, wind speed, illumination, PM2.5, PM10, pollen concentration, UV intensity, rain condition, snow condition and noise value in an environment of the gardening area. According to the detected data, the control center makes out a corresponding policy, to control operation of the gardening system. For example, when the temperature, the humidity, the wind speed and the illumination meet a preset condition, the control center controls an irrigation and mowing system to operate. When PM2.5, PM10, the pollen concentration and the UV intensity exceed a preset threshold, the control center sends information to a user equipment, to prompt the user to avoid entering the garden or take protection measures. When the rain, the snow and the noise meets the preset condition, the control center prompts the user to take protection measures, for example, carry an umbrella to go out, wear more clothes and so on.

The sensor may include a soil detection sensor that detects at least one of humidity, temperature, nutrients and PH value of the soil. Similarly, according to the detected data, the control center makes out a corresponding policy, to control operation of the gardening system. For example, when the temperature, the humidity, the nutrients and the PH value meet a preset condition, the control center controls an irrigation and mowing system to operate, such as apply fertilizer or irrigation.

The sensor may include a vegetation detection sensor that detects at least one of moisture, nutrition, pests and heights of vegetation. Similarly, according to the detected data, the control center makes out a corresponding policy, to control operation of the gardening system. For example, when the nutrition of vegetation is insufficient, targeted fertilizing and watering are carried out, or warning information is sent to the user.

The sensor may include a vegetation detection sensor that detects at least one of moisture, nutrition, pests and heights of vegetation. The vegetation detection sensor includes a lawn detection sensor that detects at least one of density, distribution, bald grasses and weeds of a lawn. Similarly, according to the detected data, the control center makes out a corresponding policy, to control operation of the gardening system. For example, for parts where the density of the grass is relatively low, irrigation and fertilization frequencies are increased, and the mowing frequency is reduced. The user is prompted to weed in a particular region and sow seeds in a particular region.

The sensor may further include a camera that may be located on the self-moving device and may also be located at a fixed position in the garden, for example, height and the like.

The camera may collect vegetation information and allow the control center to analyze a growth healthy status of the vegetation. A specific identification, for example, a QR code or label, may be placed before the vegetation. In this case, after the camera collects the vegetation and identification information, the control center can associate plants and particular positions, to instruct the gardening apparatuses to make directed maintenance.

The camera may also collect intrusion information, for example, people or animals enter the garden.

The gardening apparatuses of this embodiment are introduced below.

As stated previously, the gardening apparatuses may be a self-moving device, for example, an unmanned aerial vehicle. The unmanned aerial vehicle is provided with a camera. The unmanned aerial vehicle monitors a clean status of a user's roof and sweeps the roof accordingly. Specifically, the unmanned aerial vehicle includes an air-blowing structure that blows air towards the roof to sweep the roof. The self-moving device may further be the lawn mower or the sprinkler described above.

The gardening apparatuses may also be an irrigation apparatus including water sources, valves and pipelines, to supply water for particular regions and irrigate the particular regions.

The gardening apparatuses may further include an animal herding apparatus that herds animals using at least one of ultrasound, sound and water column.

The control center of this embodiment is introduced below.

The control center has a self-learning function, and can adjust operating parameters of the intelligent gardening system according to historical data, work situations, user habits and the like, thereby optimizing use experience. For example, the control center includes a depth learning module. By using a depth learning algorithm, the depth learning module learns, according to received sensor signals and based on spatial distribution of the sensors and temporal distribution of the signals, a changing state of the garden after being machined, the user's usage habits and the like, and improves the operating parameters. The depth learning module may also use a neural network for learning.

The control center has a data sharing module that can publish information to a particular platform with the user's permission.

For example, data is sent to a social network platform. The data includes gardening images, gardening achievement, summarized gardening data and so on. Specifically, the data sharing module can publish, for example, garden photos, community garden rankings, and some statistical data of gardens such as greening rates and flowering time; and some other information such as gardening time saved for the user and energy conservation and emission reduction data of the gardening system.

For another example, data is sent to a commercial data platform. The data includes user gardening condition information, user habit information and gardening material requirement information. For example, when the gardening system lacks fertilizer or grass flowers, information is sent to corresponding distributors, and the distributions can provide corresponding services.

The control center may further control the gardening system to implement distributed computing, thus forming a distributed computing network. Specifically, the control center summarizes idle computing capabilities of MCUs and CPUs of various apparatuses in the gardening system, and performs data processing analysis. Even, the control center orders the distributed computing network to be connected to external computing resources, and receives computing results from the external computing resources.

The control center generates, according to gardening data produced in the work of the intelligent gardening system, a garden design report that includes at least one of a garden vegetation distribution proposal, a gardening apparatus arrangement proposal, a garden vegetation varieties proposal and a garden modification and construction scheme.

The intelligent gardening system includes a D-GPS base station, and the intelligent gardening system is connected to an external Internet of Things system and shares signals of the D-GPS base station therewith.

Figure 8:
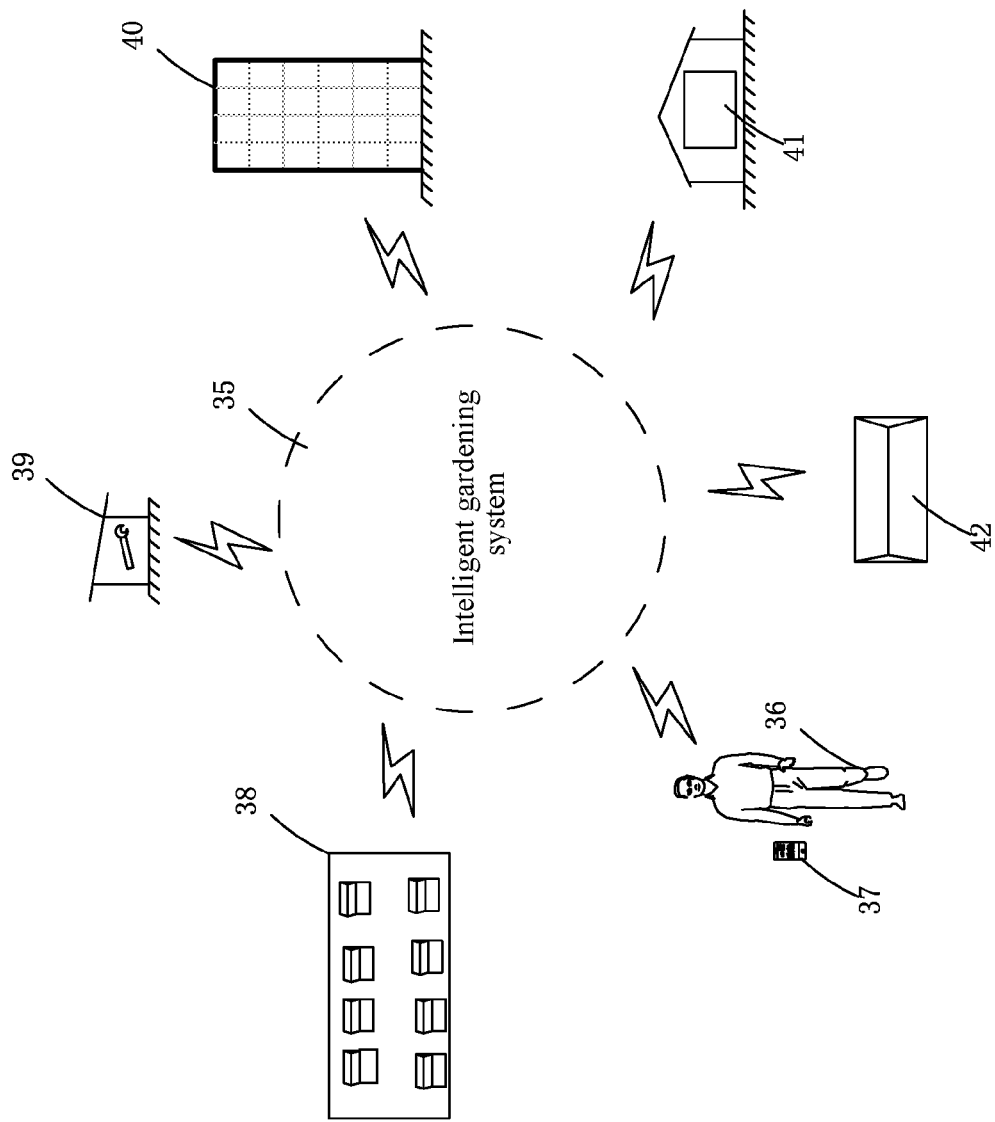
FIG. 8 is a structural block diagram of an eighth embodiment of the present invention.

As in FIG. 8, the control center of this embodiment is connected to an external Internet of Things, and optimizes an operating procedure of the intelligent gardening system based on data of the external Internet of Things. The intelligent gardening system 35 may be connected to an external device, for example, a user equipment 37 of the user 36, a service provider 39, a manufacturer 40, a distributor 41, the user's own home Internet of Things 42, and a gardening Internet of Things or home Internet of Things of a neighbor 38 in a community. In this case, the intelligent gardening system communicates with an external device, and sends data generated in the operation to the external device, and the external device includes at least one of a manufacturer device, a distributor device, a designer device and a service provider device. The external device acquires data generated by the intelligent gardening system in the operation, and generates a data application policy based on the data. The data includes at least one of data detected by the sensors, operation or fault data of the gardening apparatuses and analytical data of the intelligent gardening system.

When connected to the user equipment 37, the intelligent gardening system 35 may send to the user at least one of prompt information, statistic information, gardening proposal information, service information and order information. For example, the intelligent gardening system may prompt the user that the garden has some particular problems and some maintenance operations are required, for example, pesticide spraying is required when there are pests. The statistic information includes irrigation water statistics, mowing number statistics, plant height, flowering time data and so on. The service information includes proposals of providing a specific commodity or service for the user, for example, the user is notified about purchasing information and locations of suitable pesticides or grasses and flowers, or what desired devices the user needs to add, for example, the user is prompted to purchase a scarifier when the user finds that the soil is harder, and the user is prompted to purchase a lawn mower when the grass grows faster. The order information includes logistics information of items purchased by the user and the like.

At the same time, the control center of the intelligent gardening system 35 receives a control instruction from the user equipment to perform user-desired operations. For example, according to the user's specific instruction and user preference, lush or neat grasses are maintained, fertilizer is applied for specific flowers and plants, and so on.

Also, a specific mode is entered according to a user instruction. The intelligent gardening system includes multiple operating modes that include at least one of a party mode, a security mode, a vacation mode and a home mode, and the control center configures operating statuses of the sensors and the gardening apparatuses according to the modes. In the party mode, the intelligent gardening system configures operating parameters suitable for holding a party in the gardening area. For example, multiple gardening apparatuses, for example, the self-moving devices, leave personnel activity regions in the gardening area or stop operating, and the irrigation apparatus stops watering. In the security mode, the intelligent gardening system configures operating parameters suitable for users' leaving home. For example, the gardening apparatuses including the self-moving device perform security work, patrol and conduct videotaping at home, and alarm or inform the user when someone enters. In the vacation mode, the intelligent gardening system configures operating parameters suitable for users' leaving home for several days. For example, some water and electricity facilities are turned off in the gardening area, but necessary garden maintenance work is kept. In the home mode, the intelligent gardening system configures operating parameters suitable for users' being at home. For example, the intelligent gardening system adjusts operating parameters of the gardening apparatuses to reduce operating noise, avoiding the user and so on.

When the external device is a manufacturer device, the data application policy includes at least one of a production plan improvement policy, a manufacturing process and/or production process improvement policy, an intelligent gardening system configuration adjustment policy, a product orientation sales and/or recommendation policy and a security policy. Specifically, for example, when receiving that the user often uses a certain kind of gardening apparatuses but does not use other apparatuses or often use some specific functions, the manufacturer device adjusts the yield of the related gardening apparatuses, improves configuration thereof, cancels unnecessary functions, and the like. When some regional preferences of the product are found, specific commodities are produced or cargos are allocated for the region.

When the external device is a distributor device, the data application policy includes at least one of a stocking policy, a logistics policy, a product recommendation policy, a maintenance reminder policy and a directed marketing policy. Specifically, for example, when receiving that the user prefers a certain kind of gardening tools in a specific reason, the distributor adopts targeted stocking and logistics policies. When it is found that a garden system of a certain place lacks a certain kind of tools, directed marketing is conducted for the region. When damage information of the gardening apparatuses is received, prompt of maintenance is provided, and preparations are made in advance.

When the external device is a service provider device, the data application policy includes at least one of a service scheduling policy, a directed service policy and a neighbor resource invocation policy. For example, after receiving service demand information of several garden systems is received, a service schedule is arranged pertinently, and a directed service is provided. Even when a certain garden lacks a certain gardening apparatus, with the user's permission, neighbor apparatuses of the same community are temporarily invoked to work for him.

When the external device is a designer device, the data application policy includes at least one of a product definition policy and a product design policy. For example, upon receipt of usage preference and garden data of a user in a specific region, product demands are precisely defined and markets are segmented, to make out a product definition policy. Upon receipt of easy damage of some gardening apparatuses or feedback of other users, a product design policy is generated pertinently, and the like.

When the external device is another community Internet of Things system, the intelligent gardening system can construct multiple Internet of Things systems into a network, to implement sharing of resources and information, for example, share a Dgps base station, and share some gardening apparatuses such as a robot mower.

When the external device is the user's own indoor Internet of Things, it is possible to share various kinds of data in a family, implement intelligent work and cooperate to work. For example, windows are automatically opened and closed according to PM2.5 information detected by sensors in the garden, according to the master's indoor work and rest, work time of the gardening apparatuses in the garden is adjusted, to avoid the master's rest time, and so on.

The technical features of the embodiments described above may be combined arbitrarily. To make the description concise, not all possible combinations of the technical features in the above embodiments are described. However, as long as the combinations of the technical features are not contradictory, the combinations should be considered as falling within the scope of the specification.

The above embodiments merely express several implementations of the present invention, and the descriptions are relatively specific and detailed, but cannot be thus understood as limitations to the patent scope of the present invention. It should be indicated that those of ordinary skill in the art may also make several transformations and improvements without departing from the concept of the present invention, and the transformations and improvements all belong to the protection scope of the present invention. Therefore, the patent protection scope of the present invention should be based on the appended claims.

What is claimed is:

1. An intelligent gardening system, for monitoring and controlling gardening apparatuses in a gardening area, comprising:
    multiple sensors that collect environmental information of the gardening area;
    multiple gardening apparatuses that perform gardening work according to a control instruction;
    a self-moving device that is capable of autonomously moving in the gardening area; and
    a control center that generates the control instruction based on the environmental information; wherein the sensors, the gardening apparatuses and the control center communicate with each other to form an Internet of Things;
    wherein the intelligent gardening system comprises multiple operating modes that comprise a party mode, a security mode, a vacation mode and a home mode, the control center configures operating statuses of the sensors and the gardening apparatuses according to one of the modes in response to a user instruction, wherein:
    in the party mode, the intelligent gardening system configures operating parameters suitable for holding a party in the gardening area and multiple gardening apparatuses leave or stop operating in personnel activity areas in the gardening area;
    in the security mode, the intelligent gardening system configures operating parameters suitable for users' leaving home and the gardening apparatuses perform security work;
    in the vacation mode, the intelligent gardening system configures operating parameters suitable for users' leaving home for several days and some facilities in the gardening area are turned off; and
    in the home mode, the intelligent gardening system configures operating parameters suitable for users' being at home and the intelligent gardening system adjusts operating parameters of the gardening apparatuses to reduce operating noise;
    wherein the intelligent gardening system communicates with an external device, and sends data generated in the operation to the external device, and the external device comprises at least one of a manufacturer device, a service provider device, a distributor device, and a designer device.

2. The intelligent gardening system according to claim 1, wherein at least one of the gardening apparatuses is disposed on the self-moving device capable of autonomously moving in the gardening area.

3. The intelligent gardening system according to claim 1, wherein at least one of the sensors is located on the self-moving device capable of autonomously moving in the gardening area, and the sensor moves with the self-moving device to collect environmental information of multiple positions.

4. The intelligent gardening system according to claim 1, wherein the sensors comprise at least one of a thermistor sensor, an environment detection sensor, a soil detection sensor, a vegetation detection sensor, a lawn detection sensor and a foreign substance detection sensor, the thermistor sensor is located on a housing of the self-moving device, the thermistor sensor detects an environment temperature value, the environment detection sensor detects at least one of humidity, temperature, wind speed, illumination, PM2.5, PM10, pollen concentration, UV intensity, rain condition, snow condition and noise value in an environment of the gardening area, the soil detection sensor detects at least one of humidity, temperature, nutrients and PH value of the soil, the vegetation detection sensor detects at least one of moisture, nutrition, pests and heights of vegetation, the lawn detection sensor detects at least one of density, distribution, bald grasses and weeds of a lawn, the foreign substance detection sensor detects at least one of pets, excrement, metal, glass, dead leaves and ground collapse in the gardening area.

5. The intelligent gardening system according to claim 1, wherein the gardening apparatuses comprise at least one of a sprinkler, a fertilizer apparatus, a plant pruning apparatus, a soil treatment apparatus and an animal herding apparatus, the animal herding apparatus herds animals using at least one of ultrasound, sound and water column.

6. The intelligent gardening system according to claim 1, wherein the intelligent gardening system further comprises a locating apparatus located on the self-moving device, to acquire position information of a particular position while acquiring environmental information of the particular position, and the control module generates, according to the environmental information and the position information of the particular position, a control instruction of controlling an operating module at the particular position.

7. The intelligent gardening system according to claim 1, wherein the control center is located on the self-moving device.

8. The intelligent gardening system according to claim 1, wherein the control center comprises a memory that stores data monitored by the sensor and/or analytical/statistical data of the intelligent gardening system.

9. The intelligent gardening system according to claim 1, wherein the control center comprises a depth learning module that learns, according to input signals of at least one sensor, users' usage habits and optimizes operating parameters of the intelligent gardening system.

10. The intelligent gardening system according to claim 1, wherein the Internet of Things transmits data between at least part of nodes in the form of encryption.

11. The intelligent gardening system according to claim 1, wherein the control center comprises a data sharing module that can send data of the intelligent gardening system to a particular target under the control of a user.

12. The intelligent gardening system according to claim 11, wherein the particular target is a social network platform, and the data comprises at least one of gardening images, gardening achievement and summarized gardening data.

13. The intelligent gardening system according to claim 11, wherein the particular target is a commercial data platform, and the data comprises at least one of user gardening condition information, user habit information and gardening material requirement information.

14. The intelligent gardening system according to claim 1, wherein the intelligent gardening system is connected to an external Internet of Things, and optimizes an operating procedure of the intelligent gardening system based on data of the external Internet of Things.

15. The intelligent gardening system according to claim 14, wherein the external Internet of Things is an Internet of Things of a user's home.

16. The intelligent gardening system according to claim 1, wherein the intelligent gardening system has a distributed computing network that comprises multiple sensors and/or computing units of the gardening apparatuses.

17. The intelligent gardening system according to claim 16, wherein the distributed computing network is connected to external computing resources, and receives computing results from the external computing resources.

18. The intelligent gardening system according to claim 1, wherein the intelligent gardening system comprises a D-GPS base station, and the intelligent gardening system is connected to an external Internet of Things system and shares signals of the D-GPS base station therewith.

19. The intelligent gardening system according to claim 1, wherein the self-moving device is an unmanned aerial vehicle that is provided with a camera.

20. The intelligent gardening system according to claim 1, wherein the control center generates, according to gardening data produced in the work of the intelligent gardening system, a garden design report that comprises at least one of a garden vegetation distribution proposal, a gardening apparatus arrangement proposal, a garden vegetation varieties proposal and a garden modification and construction scheme.

21. The intelligent gardening system according to claim 1, wherein the control center communicates with a user equipment.

22. The intelligent gardening system according to claim 21, wherein the control center sends at least one of prompt information, statistic information, gardening proposal information, service information and order information.

23. The intelligent gardening system according to claim 21, wherein the control center receives a control instruction from the user equipment to perform a user-desired operation.

24. The intelligent gardening system according to claim 1, wherein in the party mode irrigation apparatus comprised in the system stops watering; in the security mode the self-moving device patrols and conducts videotaping at home, and alarm or inform the user when someone enters; and in the vacation mode some water and electricity facilities are turned off in the gardening area, but necessary garden maintenance work is kept.

25. An external device communicating with at least one of the intelligent gardening system according to claim 1, wherein the external device acquires data generated by the intelligent gardening system in the operation, and generates a data application policy based on the data, and the external device is a manufacturer device.

26. The external device according to claim 25, wherein the data comprises at least one of data detected by the sensors, operation or fault data of the gardening apparatuses and analytical data of the intelligent gardening system.

27. The external device according to claim 25, wherein the data application policy comprises at least one of a production plan improvement policy, a manufacturing process and/or production process improvement policy, an intelligent gardening system configuration adjustment policy, a product orientation sales and/or recommendation policy and a security policy.

28. An external device communicating with at least one of the intelligent gardening system according to claim 1, wherein the external device acquires data generated by the intelligent gardening system in the operation, and generates a data application policy based on the data, and the external device is a distributor device.

29. The external device according to claim 28, wherein the data application policy comprises at least one of a stocking policy, a logistics policy, a product recommendation policy, a maintenance reminder policy and a directed marketing policy.

30. An external device communicating with at least one of the intelligent gardening system according to claim 1, wherein the external device acquires data generated by the intelligent gardening system in the operation, and generates a data application policy based on the data, and the external device is a service provider device.

31. The external device according to claim 30, wherein the data application policy comprises at least one of a service scheduling policy, a directed service policy and a neighbor resource invocation policy.

32. An external device communicating with at least one of the intelligent gardening system according to claim 1, wherein the external device acquires data generated by the intelligent gardening system in the operation, and generates a data application policy based on the data, and the external device is a designer device.

33. The external device according to claim 32, wherein the data application policy comprises at least one of a product definition policy and a product design policy.

34. The intelligent gardening system according to claim 1, wherein the external device comprises a service provider device.

\* \* \* \* \*